United States Patent [19]

Sakamoto et al.

[11] Patent Number: 4,577,409
[45] Date of Patent: Mar. 25, 1986

[54] PEN CHANGING APPARATUS FOR PLOTTER

[75] Inventors: Masami Sakamoto; Ryoichi Nagumo; Tamio Ishihara, all of Katsuta, Japan

[73] Assignee: Hitachi, Ltd., Tokyo, Japan

[21] Appl. No.: 737,480

[22] Filed: May 24, 1985

[51] Int. Cl.[4] ............... B43L 13/00; G01D 15/16
[52] U.S. Cl. .................................. 33/18.1; 33/44; 33/32.3; 346/139 R
[58] Field of Search ............... 33/18 R, 20 R, 32 R, 33/32 C, 40, 44; 346/141, 139 R, 139 C, 140 R

[56] References Cited

U.S. PATENT DOCUMENTS

| | | | |
|---|---|---|---|
| 2,557,447 | 6/1951 | Masi | 33/18 R |
| 3,593,426 | 7/1971 | Domagalski | 33/18 R |
| 3,628,252 | 12/1971 | Muller | 33/32 C |
| 3,683,411 | 8/1972 | Ikeda | 346/139 R |
| 4,157,552 | 6/1979 | Nakajima | 33/18 R |

Primary Examiner—Willis Little
Attorney, Agent, or Firm—Antonelli, Terry & Wands

[57] ABSTRACT

A pen changing apparatus for a plotter is disclosed. A plurality of pens are mounted on a carriage in alignment with the axial direction of a shaft which is provided on the carriage as the sliding axis thereof. A guide shaft is fixed onto the carriage in the same direction as the shaft. A sliding lever for pressing any of the plurality of pens is provided on the guide shaft such as to be movable in the axial direction of the guide shaft and rotatable around the guide shaft. A solenoid rotates the sliding lever so as to press down a desired pen at the position where the sliding lever is located in resistance to a pen lifting spring or restore the pen to its original position by the urging force of the pen lifting spring. Leaf springs position the sliding lever over the desired pen and retain the same when the sliding lever is moved and stoppers are provided approximately at both end portions of the travelling range of the carriage such as to stop the sliding lever alone at the position over the desired pen at the time of moving the carriage.

16 Claims, 8 Drawing Figures

PEN CHANGING APPARATUS FOR PLOTTER

BACKGROUND OF THE INVENTION

This invention relates to a pen changing apparatus for a plotter, and more particularly to a pen changing apparatus suitable for a plotter composed of a plurality of pens mounted on a carriage.

Conventionally, there are two types of pen changing apparatus for a plotter composed of a plurality of pens mounted on a carriage; one is a pen changing apparatus of the type which consists of pen driving portions of an appropriate number corresponding to the number of pens wherein the appropriate pen driving portions are selected for the purpose of moving the relevant pens up and down and changing them, as is shown in FIGS. 1 and 2; and the other is a pen changing apparatus of the type which consists of a rotatable pen holder with a plurality of pens attached thereto wherein pens are changed by rotating the holder, as is shown in FIG. 3.

Referring to FIG. 1, four pens 1a to 1d are attached to the respective arms 2a to 2d and are moved up and down with an arm supporting point 3 as their axis of rotation. Solenoids 4a to 4d for driving the relevant pens 1a to 1d are attached to the arms 2a to 2d, respectively, on the opposite side of the pens 1a to 1d so as to attract or release the arms 2a to 2d in accordance with an electrical signal "ON" or "OFF". In the example shown in FIG. 1, when the solenoids 4a to 4d are in the "ON" state, the pens 1a to 1d are raised away from the paper, and when they are in the "OFF" state, the pens 1a to 1d are lowered such as to come into contact with the paper by return springs 5a to 5d. That is, by selecting a solenoid to which a signal is to be sent, it is determined which pen is to be moved up and down. However, when pens are changed, a shifting operation by a degree corresponding to he interval between pens is necessary in order to equalize the original point of each pen. Further a carriage 6 must slide on the shafts 7 and 8 with the plurality of pens 1a to 1d and the solenoids 4a to 4d mounted thereon. The referential numeral 9 denotes a solenoid wiring and 10 a string for moving the carriage 6.

An apparatus of this type has the following disadvantages. Since each pen requires one solenoid as its driving portion, the number, and hence the weight of parts such as solenoids and arms which are mounted on the carriage 6 is increased and wiring becomes complicated. Furthermore, not only is the driving load of the carriage increased but also the manufacturing cost is raised significantly.

FIG. 2 is a sectional view of another example of a pen driving device, which shows one pen a plurality of pens. The referential numeral 20 represents a pen, 21 a pen lifting spring, 22 a carriage, 23 a solenoid, and 24 solenoid wiring. There is nothing corresponding to the arm in FIG. 1, and the pen 20 is directly driven by the solenoid 23. In this case also, the following problems remain unsolved. Since the pen 20 is driven by the solenoid 23, the required number of solenoids 23 equals that of pens 20. Since it is necessary to coat the pen 20 with a magnetic material, the cost of the pen 20 is raised. It is necessary to heighten the accuracy of the sliding surface of the pen 20. In addition, in order to have the solenoid 23 built-in, the structure of the carriage 22 becomes complicated and thus expensive.

Referring to FIG. 3, the referential numerals 31a to 31d represent pens, 32 a rotary holder, 33a, 33b, ... projections which are provided at regular intervals on the outer peripheral portion of the rotary holder 32, 35 a carriage, 36, 37 shafts, 38 a frame, 39 a pin, 40a, 40b supporting points, 41 a pen lever, 42 a solenoid, 43 a return spring, and 44 a string. The pens 31a to 31d are attached to the outer periphery of the rotary holder 32 at equal intervals. The rotary holder 32 rotates around the rotary shaft 34 and the pens 31a to 31d are retained at equal intervals by a spring, a ratchet (not shown), and so forth. The rotary holder 32 slides in the axial direction of the shafts 36, 37 together with the carriage 35. A desired pen (in the FIG. 31c) is moved up and down when the pen lever 41 is raised and lowered by means of the solenoid 42 and the return spring 43. When an instruction for changing pens is received, the carriage 35 travels in the direction indicated by the arrow a, and one of the projections 33a, 33b, ... which are provided at regular intervals on the outer periphery of the rotary holder 32 hits the pin 39 which protrudes from the frame 38, whereby the rotary holder 32 rotates in the direction indicated by the arrow b. After the holder 32 is rotated through a certain angle, the carriage 35 is moved in the opposite direction indicated by the arrow a. This operation is repeated until the desired pen comes to the position of the pen 31c, and the pens are then changed. According to this system, only one driving portion consisting of the solenoid 42 suffices, but a mechanism is required for smoothly rotating the rotary holder 32 and retaining each of the pens 31a to 31d at equal intervals by means of a ratchet and so forth. Therefore, disadvantageously, the structure becomes complicated, and changing pens takes much time because several reciprocating motions of the carriage 35 are necessary for each pen changing operation.

SUMMARY OF THE INVENTION

Accordingly, it is an object of the invention to eliminate the above-described disadvantages and to provide a pen changing apparatus for a plotter which has a simple structure, reduced number of parts, and which enables a rapid pen changing operation.

To achieve this aim, an apparatus according to the invention is composed of a carriage which slides linearly with a shaft as a sliding axis and on which a plurality of pens are mounted in alignment with the axial direction of the shaft; a moving means for moving the carriage; a guide shaft which is fixed onto the carriage in the same direction as the shaft; a sliding lever for pressing any of the plurality of pens which is provided on the guide shaft such as to be movable in the axial direction of the guide shaft and rotatable around the guide shaft; positioning and retaining means for positioning the sliding lever over any of the plurality of pens and retaining the same when the sliding lever is moved; stoppers provided approximately at both end portions of the travelling range of the carriage for stopping the sliding lever alone at a position over a desired pen at the time of moving the carriage; and sliding lever driving means for rotating the sliding lever so as to press down the pen at the position where the sliding lever is located in resistance to a pen lifting spring or to restore the pen to its original position by the urging force of the pen lifting spring.

The above and other objects, features and advantages of the present invention will become clear from the following description of the preferred embodiments

DESCRIPTION OF THE PREFERRED EMBODIMENTS

This invention will first be described in detail with reference to an embodiment shown in FIG. 4 and FIGS. 5 and 6.

Figure 1:
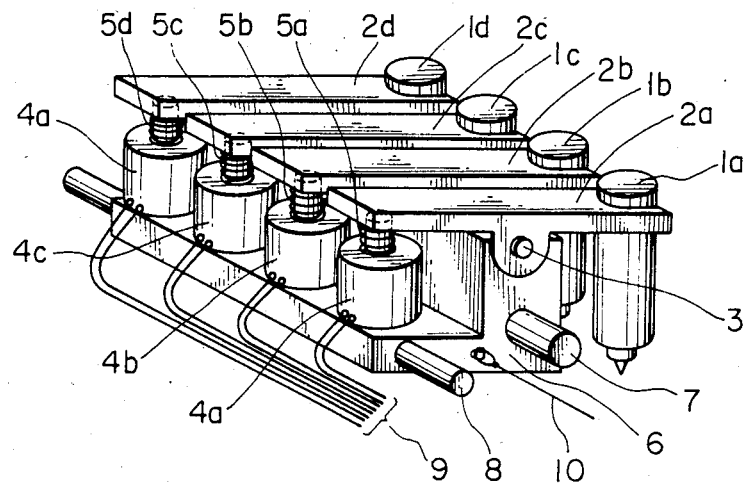
FIGS. 1 to 3, respectively, show conventional pen replacing apparatus.
Figure 2:
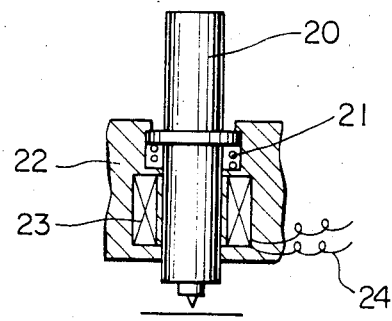
Figure 3:
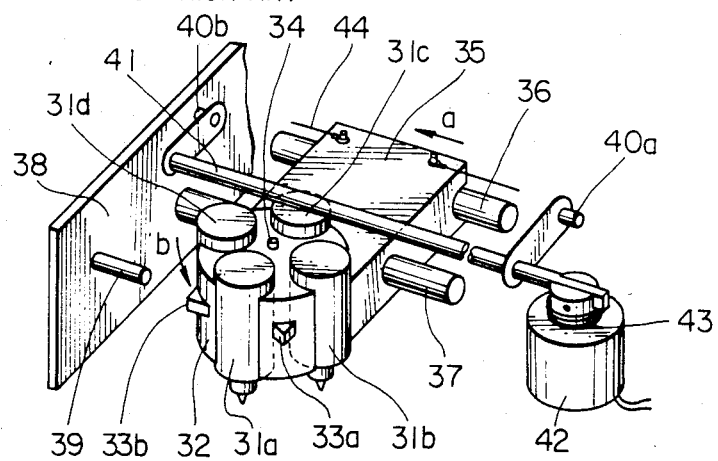
Figure 4:
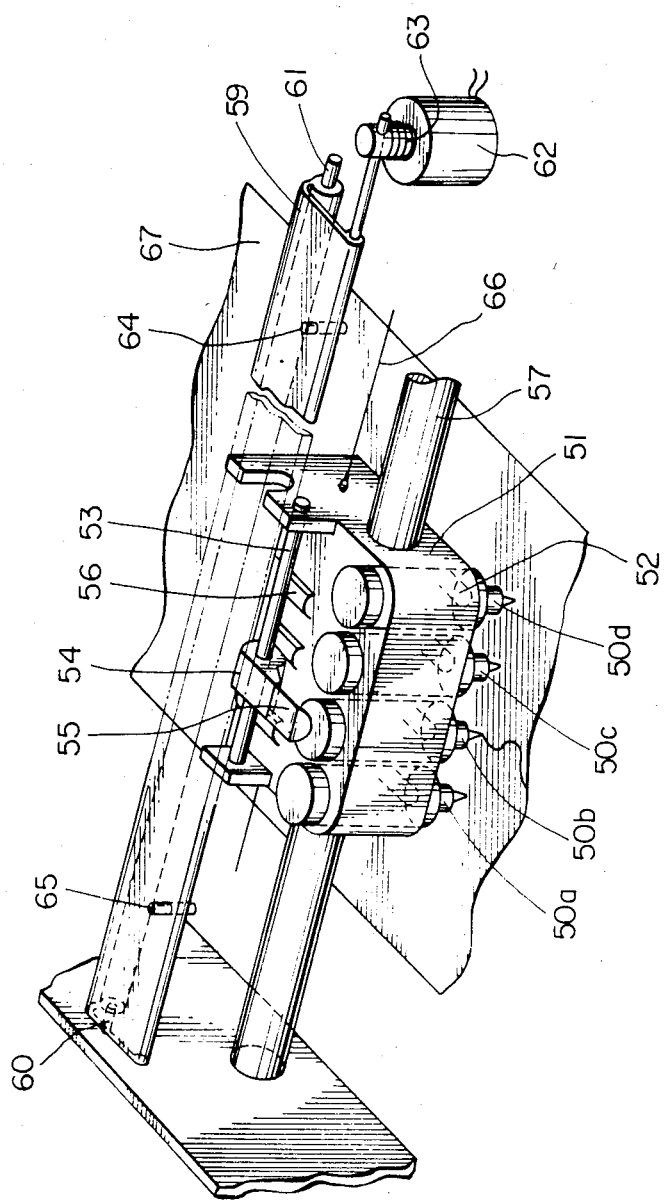
FIG. 4 shows the structure of an embodiment of a pen changing apparatus for a plotter according to the invention.
Figure 5:
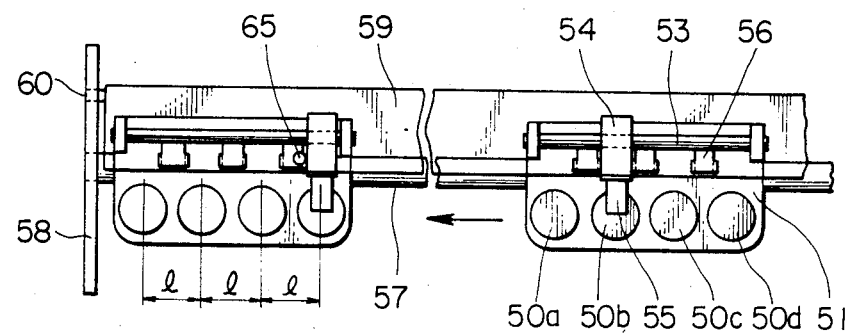
FIGS. 5 and 6, respectively, are explanatory views of the pen changing devices in the state wherein pens are being changed.

FIG. 4 shows the structure of an embodiment of a pen changing apparatus for a plotter according to the invention. In the Figure, four pens 50a to 50d are attached to a carriage 51 and forming a row in the sliding direction such as to move up and down perpendicularly relative to the paper 67. In the ordinary state, the pens 50a to 50d are retained in the elevated state by a pen lifting spring 52. The carriage 51 is provided with a shaft 53 which is disposed in the same direction as the sliding direction of the carriage 51, and a pen lever 54 (sliding lever) is provided on the shaft 53 such as to be slidable and rotatable within the carriage 51 with the shaft 53 as a guide shaft. A leaf spring 55 for keeping constant the pressure constant which is applied on a pen when the pen is lowered to come into contact with the paper is integrally provided at the end of the pen lever 54. Leaf springs 56 are provided so as to position the end of the leaf spring 55 at an interval corresponding to the interval between pens such that the end of the leaf spring 55 is located at the head portion of one of the pens 50a to 50d and that the pen lever 54 is not moved by virtue of any force below a predetermined value. In FIG. 4, is shown the state in which the leaf springs 56 retain the pen lever 54 such that the pen lever 54 is located at the center of the head portion of the pen 50b. When the pen lever 54 in this position is made to pivot about the shaft 53 such that the end of the pen lever 54 forms a circular arc, the pen 50b moves up and down. The referential numeral 57 represents a shaft which is secured to a frame 58 and the carriage 51 is slidably mounted on the shaft 57. A lever 59 is attached to the frame 58 such as to be pivotable around supporting points 60 and 61 and at one end of the lever 59 is provided a solenoid 62 for imparting pivotal motion to the lever 59. The lever 59 has a length sufficient to allow the pivotal motion to be imparted the pin lever 59 in any position within the sliding range of the carriage 51. The referential numeral 63 denotes a return spring for returning a lever which is provided on the solenoid 62. The lever 59 also serves as a sliding guide for the carriage 51 and pins 64 and 65 for stopping the pen lever 54 for the purpose of changing pens are fixed to the portions of the lever 59 above both ends of the paper which are out of the drawing range.

The carriage 51 moves in the axial direction with the shaft 57 and the cylindrical portion of the lever 59 as a sliding surface with the pens 50a to 50d and the shaft 57 mounted thereon. This movement is effected by a motor or the like through a string 66 or a belt.

The operation will next be explained. When an electrical signal is input to the solenoid 62, the lever 59 moves down (pivotal motion) around the supporting points 60 and 61 of the lever 59. At the same time, the pen lever 54 which is in contact with the lever 59 rotates around the shaft 53, whereby, in the case shown in FIG. 4, the end of the leaf spring 55 presses the head portion of the pen 50b and lowers the pen 50b so as to draw a figure on the paper 67. When the solenoid 62 is switched off, the lever 59 is elevated by the return spring 63, and the pen 50b is elevated by virtue of the returning force of the pen lifting spring 52. Supposing the axial direction of the shaft 57 is axis Y and the direction perpendicular to the axis Y on the paper is axis X, the pen is moved in the direction of the axis Y by moving the carriage 51 and in the direction of the axis X by moving the paper 67 or by moving the overall system of the axis Y, whereby the pen is moved on the plane XY and a figure is drawn. The pen is moved in the direction X or Y by a motor or the like.

The operation of changing pens will next be explained. FIGS. 5 and 6 are explanatory views of the apparatus shown in FIG. 4 in the state wherein pens are being changed. FIG. 5 shows the case of changing the pen 50d for the pen 50b. When the pen lever 54 is at the position of the pen 50b (the case shown in the righthand portion of FIG. 5), and an instruction saying, "Change the pen 50d for the pen 50b" is input from a CPU (not shown), the carriage 51 moves to the left (in the direction indicated by the arrow) and the pen lever 59 hits the pin 65 which is secured tp the lever 59, whereby the pen lever 54 is stopped. However, the carriage 51 does not stop but travels a further distance 2 l corresponding to the distance between the pen 50b and the pen 50d. Since the leaf spring 56 for positioning is designed such that the pen lever 54 moves smoothly with a force which does not interrupt the travelling of the carriage 51, the pen lever 54 stops at the position of the pen 50d. When the pen lever 54 finishes its movement, the carriage 51 starts to travel in the opposite direction relative to the direction indicated by the arrow and is restored to the original position in the state wherein the pen is changed.

Figure 6:
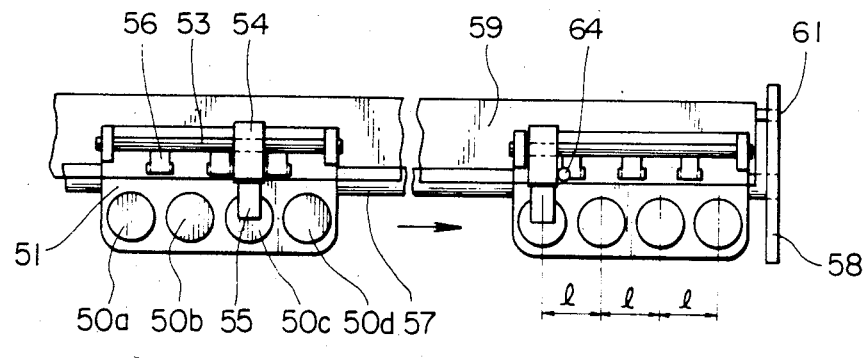

FIG. 6 shows the case of changing the pen 50a for the pen 50c. The carriage travels to the right (in the direction indicated by the arrow) in contrast with the case in FIG. 5, and the pen lever 54 stops at the position of the pin 64. The carriage 51 travels a further distance 2 l, and the pen lever 54 stops at the position of the pen 50a, whereby the pen is changed. Irrespective of the present position of a pen, when that pen is replaced by a pen on its right side, the carriage 51 is moved to the left, as is shown in FIG. 5, while when the pen is replaced by a pen on its left side, the carriage 51 is mvoed to the right, as is shown in FIG. 6. Since the amount of movement of the pen lever 54 required for changing pens is a whole number multiple of the interval l between pens, if the present position of a pen is memorized, the direction and amount of movement is determined easily, whereby the pen is easily changed. In addition, irrespective of the positions of pens to be changed, reciprocating motion of the carriage 51 is sufficient for changing the pens.

Figure 7:
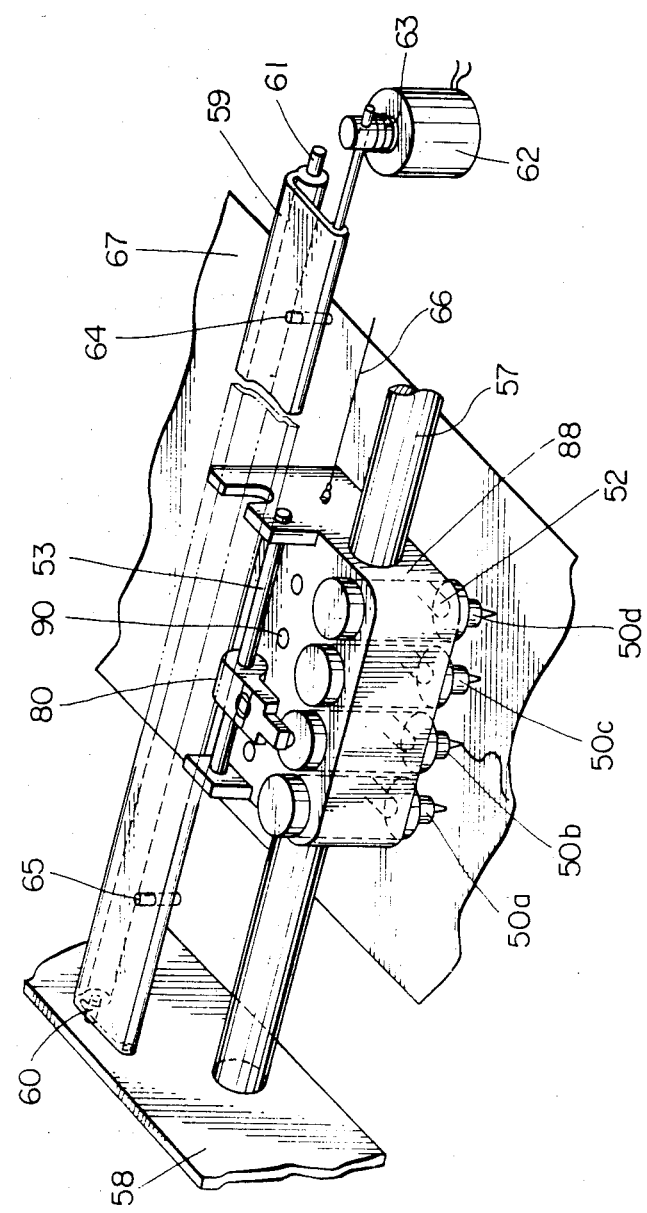
FIG. 7 shows the structure of another embodiment of a pen changing apparatus for a plotter according to the invention.
Figure 8:
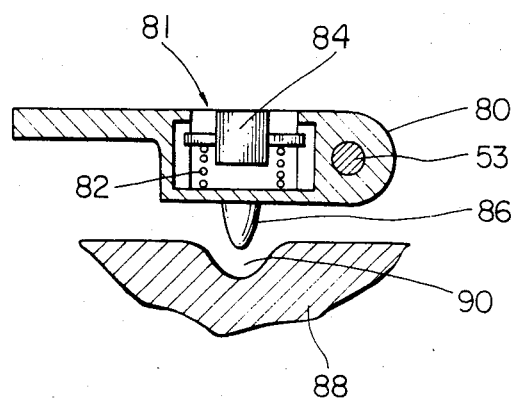
FIG. 8 is a partially enlarged view of the apparatus shown in FIG. 7.

FIG. 7 shows another embodiment of a pen changing apparatus for a plotter according to the invention and FIG. 8 is a partially expanded sectional view of the embodiment shown in FIG. 7.

The embodiment shown in FIGS. 7 and 8 is the same as the embodiment shown in FIG. 4. Except for a particular part of the carriage and the pen lever. In this embodiment, a coiled spring 82 and a roller 84 are disposed in the recess 81 in the vicinity of the central portion of a pen lever 80, and a projection 86 is provided on the lower end portion of the pen lever 80. On the carriage 88 depressions 90 are provided at regular corresponding to the interval between the pens 50a, 50b, 50c and 50d such that the pen lever 80 is not moved by virtue of a force below a predetermined value when the projection 86 of the pen lever 80 is located in the depression 90. This embodiment, thus, dispenses with the need for the leaf springs 55 and 56 in the embodiment shown in FIG. 4.

When the carriage 88 moves at the time of changing pens, the pen lever 80 comes into contact with the pin 65 or 64 and stops. The coiled spring 82, projection 86 and depressions 90 are designed such that the pen lever 80 is moved on the shaft 53 with a force which does not interrupt the movement of the carriage 88 after the pen lever 80 stops.

As has been described above, the embodiments of the invention have a simple structure with a small number of parts and are capable of changing pens easily. Further, the operation required for changing pens is only one reciprocating motion of the carriage 51 or 88, whereby the time for changing pens can be shortened in comparison with the system in which pens are changed by rotation.

In the embodiments shown in FIGS. 4 and 7, an apparatus with the four pens 50a to 50d are shown, but the number of pens can be increased without increasing the number of parts.

As is described above this invention is advantageous in that the structure is simple, the number of parts can ne reduced and pens can be changed easily and in a short time.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A pen changing apparatus for a plotter comprising:
   a plurality of pens;
   a carriage which slides linearly with a shaft as the sliding axis thereof and on which a plurality of pens are mounted in alignment with the axial direction of said shaft;
   a moving means for moving said carriage;
   a guide shaft which is fixed onto said carriage in the same direction as said shaft;
   a sliding lever provided on said guide shaft such as to be movable in the axial direction of said guide shaft and rotatable around said guide shaft for pressing any of said plurality of pens;
   positioning and retaining means for positioning said sliding lever over any of said plurality of pens and retaining the same when said sliding lever is moved;
   stoppers provided approximately at both end portions of the travelling range of said carriage for stopping said sliding lever along at a position over a desired pen at the time of moving said carriage; and
   sliding lever driving means for rotating said sliding lever so as to press down said pen in the position where said sliding lever is located in resistance to a pen lifting spring or restore said pen to its original position by the urging force of said pen lifting spring.

2. A pen changing apparatus for a plotter according to claim 1, wherein the portion of said sliding lever which comes into contact with the head portion of said pen is composed of an elastic material.

3. A pen changing apparatus for a plotter according to claim 1, wherein said positioning and retaining means are composed of flexible members consisting of an elastic material which are arranged at regular intervals corresponding to the interval between each of said plurality of pens.

4. A pen changing apparatus for a plotter according to claim 2, wherein said positioning and retaining means are composed of flexible members consisting of an elastic material which are arranged at regular intervals of the corresponding to the interval between each of said plurality of pens.

5. A pen changing apparatus for a plotter according to claim 1, wherein said positioning and retaining means are composed of depressions on said carriage which are arranged at regular intervals of the corresponding to the interval between each of said plurality of pens, an elastic material which is provided in said sliding lever, and a projection which is provided on the lower end portion of said sliding lever such as to correspond to said depressions.

6. A pen changing apparatus for a plotter according to claim 1, wherein said sliding lever driving means is composed of a rotatable lever which is provided in parallel to said shaft such as to constantly rotate said sliding lever even when said carriage travels, and rotating means composed of a solenoid for rotating said lever and a return spring.

7. A pen changing apparatus for a plotter according to claim 2, wherein said sliding lever driving means is composed of a rotatable lever which is provided in parallel to said shaft such as to constantly rotate said sliding lever even when said carriage travels, and rotating means composed of a solenoid for rotating said lever and a return spring.

8. A pen changing apparatus for a plotter according to claim 3, wherein said sliding lever driving means is composed of a rotatable lever which is provided in parallel to said shaft such as to constantly rotate said sliding lever even when said carriage travels, and rotating means composed of a solenoid for rotating said lever and a return spring.

9. A pen changing apparatus for a plotter according to claim 4, wherein said sliding lever driving means is composed of a rotatable lever which is provided in parallel to said shaft such as to constantly rotate said sliding lever even when said carriage travels, and rotating means composed of a solenoid for rotating said lever and a return spring.

10. A pen changing apparatus for a plotter according to claim 5, wherein said sliding lever driving means is composed of a rotatable lever which is provided in parallel to said shaft such as to constantly rotate said sliding lever even when said carriage travels, and rotating means composed of a solenoid for rotating said lever and a return spring.

11. A pen changing apparatus for a plotter according to claim 5, wherein said stoppers are fixed onto said lever.

12. A pen changing apparatus for a plotter according to claim 6, wherein said stoppers are fixed onto said lever.

13. A pen changing apparatus for a plotter according to claim 7, wherein said stoppers are fixed onto said lever.

14. A pen changing apparatus for a plotter according to claim 8, wherein said stoppers are fixed onto said lever.

15. A pen changing apparatus for a plotter according to claim 9, wherein said stoppers are fixed onto said lever.

16. A pen changing apparatus for a plotter according to claim 10, wherein said stoppers are fixed onto said lever.

* * * * *